(12) United States Patent
Lee et al.

(10) Patent No.: US 11,716,451 B2
(45) Date of Patent: Aug. 1, 2023

(54) COLOR CORRECTION METHOD AND COLOR CORRECTION SYSTEM

(71) Applicant: Coretronic Corporation, Hsin-Chu (TW)

(72) Inventors: Yu-Fan Lee, Hsin-Chu (TW); Cheng-Tao Ho, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 5 days.

(21) Appl. No.: 17/214,917

(22) Filed: Mar. 28, 2021

(65) Prior Publication Data
US 2021/0368146 A1    Nov. 25, 2021

(30) Foreign Application Priority Data

May 20, 2020 (CN) .......................... 202010429719.2

(51) Int. Cl.
*H04N 9/31* (2006.01)
(52) U.S. Cl.
CPC ......... *H04N 9/3182* (2013.01); *H04N 9/3194* (2013.01)
(58) Field of Classification Search
CPC ...... H04N 9/3182; H04N 9/3194; H04N 9/31; H04N 9/3105; H04N 9/73; H04N 9/74; H04N 9/87; G09G 2320/0238; G09G 2320/0626; G09G 2320/0686; G09G 2320/0693; G09G 2320/0242; G09G 5/02; G09G 5/06; G09G 2300/0443; G09G 3/2003; G09G 3/2007; G09G 3/2077
See application file for complete search history.

(56) References Cited

U.S. PATENT DOCUMENTS

| | | | | |
|---|---|---|---|---|
| 2002/0080289 A1* | 6/2002 | Koyama | ............ | H04N 9/3182 349/5 |
| 2006/0285025 A1* | 12/2006 | Yoshida | ............ | H04N 9/3194 349/8 |
| 2011/0148904 A1* | 6/2011 | Kotani | ............ | G09G 3/006 345/589 |

(Continued)

FOREIGN PATENT DOCUMENTS

CN        102103314        8/2012

*Primary Examiner* — John W Miller
*Assistant Examiner* — Humam M Satti
(74) *Attorney, Agent, or Firm* — JCIPRNET

(57) ABSTRACT

A color correction method and a color correction system that executes the color correction method are provided. A correction image is projected on a projection screen based on a predefined value. A single frame of the correction image includes multiple regions. The multiple regions include multiple hue regions with different hues and multiple lightness regions with different lightness corresponding to the hues, or the multiple regions include multiple gray-scales regions with different gray-scales. A captured image is obtained by capturing the projection screen. Optical information of the captured image is detected. The optical information is compared with the predefined value to obtain an uneven color region that does not conform to the predefined value. The uneven color region is adjusted so that the optical information of the uneven color region conforms to the predefined value. The time for color correction can be greatly reduced accordingly.

23 Claims, 9 Drawing Sheets

(56) References Cited

U.S. PATENT DOCUMENTS

2014/0085524 A1\* 3/2014 Berglund ............. G06Q 10/101
                                                                  348/333.01
2021/0035483 A1\* 2/2021 Kim ..................... G09G 3/2003
2021/0248734 A1\* 8/2021 Han ......................... G06T 7/11

\* cited by examiner

COLOR CORRECTION METHOD AND COLOR CORRECTION SYSTEM

CROSS-REFERENCE TO RELATED APPLICATION

This application claims the priority benefit of China application serial no. 202010429719.2, filed on May 20, 2020. The entirety of the above-mentioned patent application is hereby incorporated by reference herein and made a part of this specification.

BACKGROUND

Technical Field

This disclosure relates to a projector correction mechanism, and in particular to a color correction method and a color correction system.

Description of Related Art

Currently, most projectors use projection of pure-color images with manual use of a luminance meter to carry out color correction. However, this method is time-consuming and labor-intensive if being executed during shipping of the goods. The adjustment is even more inconvenient if being carried out at the projection site of the customer. Therefore, automatic correction technology using external or built-in cameras have been proposed subsequently to execute color correction in a more precise and efficient manner.

As far as the current technology is concerned, using external or built-in cameras for color correction is carried out through the following steps. An image for correction is projected. Next, the color of the image is captured by a camera. Thereafter, the deviation between the read color value and the standard color value is calculated by an algorithm. Then, the color setting of the projector is adjusted. In addition, the above steps are repeated until all the colors and brightness to be corrected are corrected.

However, the above technology still has multiple issues. For example, assuming that a projector take turns to project 6 colors, red (R), green (G), blue (B), cyan (C), yellow (Y), and magenta (M), and also needs to project different brightness such as 25% brightness, 50% brightness, and 100% brightness, then the total number of images that needs to be projected is 18. During the correction period, the 18 images are corrected respectively and the cycle may need to be repeated multiple times, which takes a long time, and is inconvenient for the manufacturer or the user. Therefore, there is an actual need for the provision of a fast and automatic correction method in the art.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides a color correction method and a color correction system, which can greatly save time for color correction.

Other objectives and advantages of the disclosure may be further understood from the technical features disclosed in the disclosure.

In order to achieve one, some, or all of the above objectives or other objectives, an embodiment of the disclosure provides a color correction method including the following steps. A correction image is projected to a projection screen based on a predefined value, and a single frame of the correction image includes multiple regions. The multiple regions include multiple hue regions with different hues and multiple lightness regions with different lightness corresponding to the hues, or the multiple regions include multiple gray-scale regions with different gray-scales. A captured image is obtained by capturing the projection screen. Optical information of the captured image is detected. The optical information is compared with the predefined value to obtain an uneven color region that does not conform to the predefined value. And the uneven color region is adjusted, so that the optical information of the uneven color region conforms to the predefined value.

In order to achieve one, some, or all of the above objectives or other objectives, an embodiment of the disclosure provides a color correction system, which includes the following. A source device that projects a correction image to a projection screen based on a predefined value, and a single frame of the correction image includes multiple regions. The multiple regions include multiple hue regions with different hues and multiple lightness regions with different lightness corresponding to the hues, or the multiple regions include multiple gray-scale regions with different gray-scales. An image capture device that obtains a captured image by capturing the projection screen. A processor that is coupled to the image capture device and the source device, receives the captured image, detects optical information of the captured image, compares the optical information with the predefined value to obtain an uneven color region that does not conform to the predefined value, and adjusts the uneven color region, so that the optical information of the uneven color region conforms to the predefined value.

Based on the above, the embodiments of the disclosure have at least one of the following advantages or effects. The color correction method and the color correction system of the disclosure use a single frame to project a correction image of different chromaticity, different lightness, or different gray-scales in different regions, so as to correct multiple groups of colors to be corrected at once, which takes less time to achieve better results.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

To make the above features and advantages more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including", "comprising" or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

The foregoing and other technical contents, characteristics, and effects of the disclosure will be clearly presented in the following detailed description of a preferred embodiment with reference to the drawings. Directional terms, such as "upper", "lower", "left", "right", "front", or "back", mentioned in the following embodiments only refer to the directions in the accompanying drawings. Therefore, the directional terms are used for illustration, and are not intended to limit the disclosure.

Figure 1:
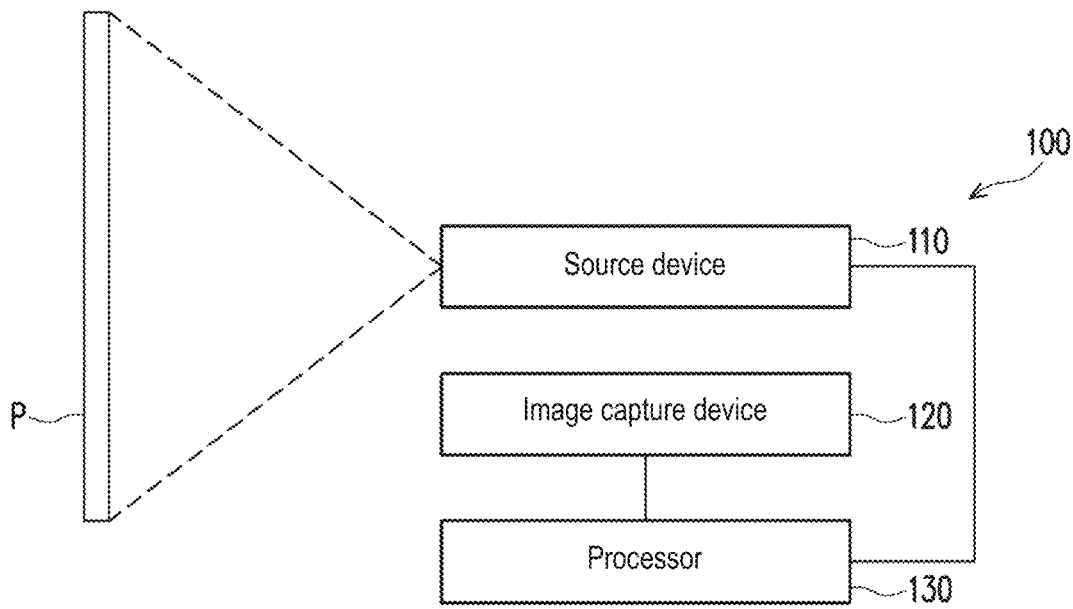
FIG. 1 is a block diagram of a color correction system according to an embodiment of the disclosure.

FIG. 1 is a block diagram of a color correction system according to an embodiment of the disclosure. With reference to FIG. 1, a color correction system 100 includes a source device 110, an image capture device 120, and a processor 130. The source device 110 projects a correction image to a projection screen P based on a predefined value. The image capture device 120 obtains a captured image by capturing the projection screen P. The processor 130 is coupled to the image capture device 120 and the source device 110, and the processor 130 receives the captured image provided by the image capture device 120 for subsequent procedures such as detection, comparison, and adjustment.

Specifically, the source device 110 is, for example, a projector. The image capture device 120 is, for example, a camera, and the image capture device 120 may include elements such as a photosensitive element (for example, a charge coupled device (CCD), a complementary metal oxide semiconductor (CMOS), etc.), an optical lens, and an image control circuit. The processor 130 is, for example, a central processing unit (CPU), other programmable general-purpose or special-purpose microprocessor, a digital signal processor (DSP), a programmable controller, an application specific integrated circuit (ASIC), other similar elements, or a combination of the above elements, but the disclosure is not limited thereto.

It is worth noting that although the image capture device 120 and the processor 130 are shown as independent components different from the source device 110 in FIG. 1, that is, the image capture device 120 is, for example, an external camera, and the processor 130 is, for example, a processing unit of an external computer, and the image capture device 120 and the processor 130 may carry out data transmission through wired or wireless communication, in other embodiments, the image capture device 120 and/or the processor 130 may be disposed in the source device 110 (not shown), that is, the image capture device 120 is, for example, a built-in camera of the projector, and the processor 130 is, for example, a built-in processing unit of the projector. Moreover, the processor 130 may also be disposed in the image capture device 120 (not shown), that is, the processor 130 is, for example, a processing unit of the camera.

Figure 2:
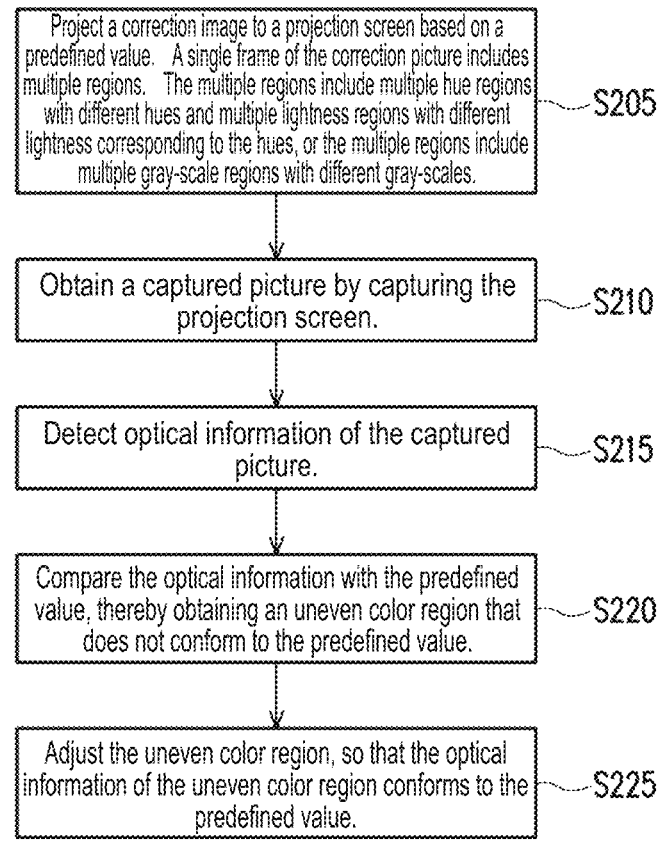
FIG. 2 is a flowchart of a color correction method according to an embodiment of the disclosure.

FIG. 2 is a flowchart of a color correction method according to an embodiment of the disclosure. The color correction method of the disclosure may be executed by the color correction system 100. With reference to FIGS. 1 and 2 at the same time, in Step S205, the source device 110 projects the correction image to the projection screen P based on the predefined value. A single frame of the correction image includes multiple regions. The multiple regions include multiple hue regions with different hues and multiple lightness regions with different lightness corresponding to the hues, or the multiple regions include multiple gray-scale regions with different gray-scales. In addition, the regions may be separated from or connected to each other. Moreover, the single frame of the correction image may also include at least one group of the multiple regions repeatedly disposed at a position different from the multiple regions.

Next, in Step S210, the image capture device 120 obtains the captured image by capturing the projection screen P. In Step S215, the processor 130 detects the optical information of the captured image. Furthermore, the optical information is, for example, the position of each pixel, such as the x and y values, that may be obtained by the processor 130 from the captured image, an RGB gray level value corresponding to each pixel, etc.

Next, in Step S220, the processor 130 compares the optical information with the predefined value, thereby obtaining an uneven color region that does not conform to the predefined value. Finally, in Step S225, the processor 130 adjusts the uneven color region, so that the optical information of the uneven color region conforms to the predefined value. Furthermore, after calculation and comparison, the processor 130 may obtain a deviation between the optical information of the uneven color region of the captured image and the predefined value, and adjust a gain value corresponding to the uneven color region based on the deviation for the gain value to conform to the predefined value, so as to achieve the effect of color correction.

Specifically, each lightness region or each gray-scale region has a predefined value. For the RGB color model, the predefined value includes the RGB gray level value. The RGB gray level value includes a first gray level value corresponding to a first primary color, a second gray level value corresponding to a second primary color, and a third gray level value corresponding to a third primary color. For example, the first primary color is red, the second primary color is green, and the third primary color is blue, while the first gray level value is an r value, the second gray level value is a g value, and the third gray level value is a b value. Therefore, the RGB gray level value of a color may, for example, be expressed as (r, g, b).

Furthermore, in the case where the single frame of the correction image includes the multiple hue regions with different hues, if each hue is a pure primary color, then one of the first gray level value, the second gray level value, and the third gray level value of the multiple lightness regions corresponding to each hue region that corresponds to the pure primary color is not zero while the other two are zero, and any two of the non-zero RGB gray level values of the lightness regions corresponding to each hue region are not the same. The pure primary color is one of the first primary color, the second primary color, and the third primary color, for example, one of pure red, pure green, and pure blue, and the RGB gray level value of pure red may be expressed as (r, 0, 0), the RGB gray level value of pure green may be expressed as (0, g, 0), and the RGB gray level value of pure blue may be expressed as (0, 0, b).

Figure 3:
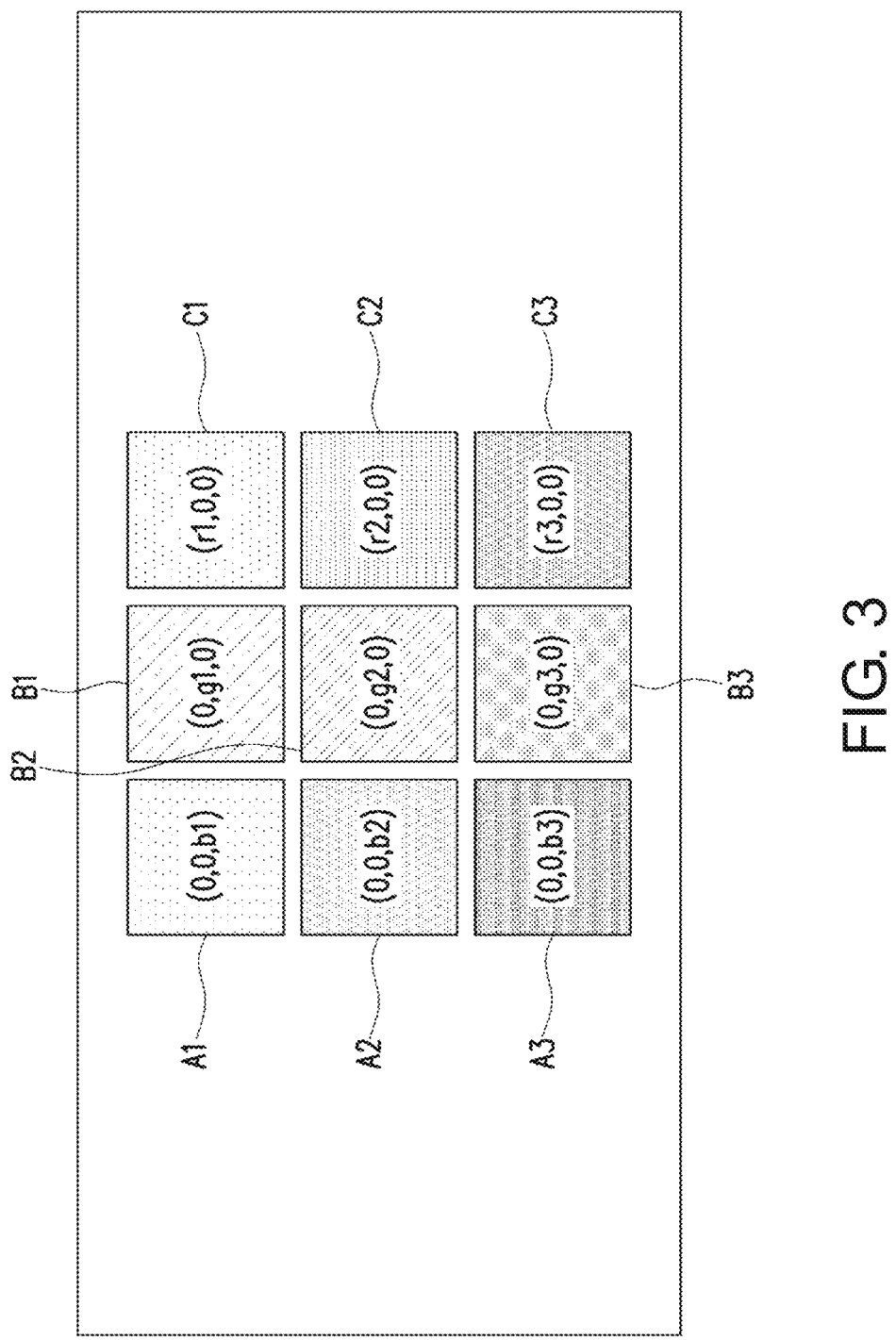
FIG. 3 is a schematic diagram of a correction image according to a first embodiment of the disclosure.

For example, FIG. 3 is a schematic diagram of a correction image according to a first embodiment of the disclosure. In FIG. 3, a single frame of the correction image includes regions A1 to A3, regions B1 to B3, and regions C1 to C3. The regions A1 to A3 are regions corresponding to a third primary color (for example, blue), the regions B1 to B3 are regions corresponding to a second primary color (for example, green), and the regions C1 to C3 are regions corresponding to a first primary color (for example, red). The regions A1, B1, and C1 are hue regions with different hues, and the regions A2 and A3, the regions B2 and B3, and the regions C2 and C3 are lightness regions corresponding to the regions A1, B1, and C1, respectively. The RGB gray level values of the regions A1 to A3 may be expressed as (0, 0, b1), (0, 0, b2), and (0, 0, b3), respectively. The RGB gray level values of the regions B1 to B3 may be expressed as (0, g1, 0), (0, g2, 0), and (0, g3, 0), respectively. The RGB gray level values of the regions C1 to C3 may be expressed as (r1, 0, 0), (r2, 0, 0), and (r3, 0, 0), respectively.

For example, the RGB gray level values of the regions A1, B1, and C1 included in the single frame of the correction image are (0, 0, 255), (0, 255, 0), and (255, 0, 0), respectively, which correspond to bright blue, bright green, and bright red, respectively. The regions A2, B2, and C2 are regions with the same hue but different lightness as the regions A1, B1, and C1, respectively. The RGB gray level values of the regions A2, B2, and C2 are, for example, (0, 0, 128), (0, 128, 0), and (128, 0, 0) respectively, which correspond to dark blue, dark green, and dark red, respectively. The regions A3, B3, and C3 are regions with the same hue but different lightness as the regions A1, B1, and C1, respectively. In addition, the regions A3, B3, and C3 are also regions with the same hue but different lightness as the regions A2, B2, and C2 respectively. The RGB gray level values of the regions A3, B3, and C3 are, for example, (0, 0, 64), (0, 64, 0), and (64, 0, 0) respectively, which correspond to dark blue, dark green, and dark red, respectively. In a better case, a single frame that includes more variety of different hue regions and lightness regions may have better correction effect. In addition, preferably, the entire correction process is executed without other signal inputs.

In addition, in other embodiments, in the case where the single frame of the correction image includes multiple hue regions with different hues, if each hue is not a pure primary color (for example, non-pure red, non-pure green, and non-pure blue), then at least two of the first gray level value, the second gray level value, and the third gray level value of the multiple lightness regions corresponding to each hue region are not zero. For example, the RGB gray level values of the hue regions or lightness regions may be expressed as (0, g1, b1), (r1, g1, 0), (r1, 0, b1), or (r1, g1, 1)1). In addition, the ratio of the first gray level value to the second gray level value to the third gray level value of the multiple lightness regions corresponding to each hue region is the same, and any two of the RGB gray level values of the multiple corresponding lightness regions are not the same. Taking (r1, g1, b1) as an example, (r1, g1, b1) has a corresponding lightness region (r2, g2, b2). The ratio of r1:g1:b1 is the same as the ratio of r2:g2:b2. For example, taking the RGB gray level value of (50, 100, 150) of one of the regions as an example, the ratio of primary colors thereof between the first gray level value, the second gray level value, and the third gray level value is 1:2:3. Therefore, the RGB gray level value of another region may be (25, 50, 75), and the RGB gray level value of yet another region may be (70, 140, 210).

In the case where the single frame of the correction image includes the multiple hue regions with different hues, the multiple lightness regions corresponding to each hue region are connectedly disposed and gradually distributed.

Figure 4:
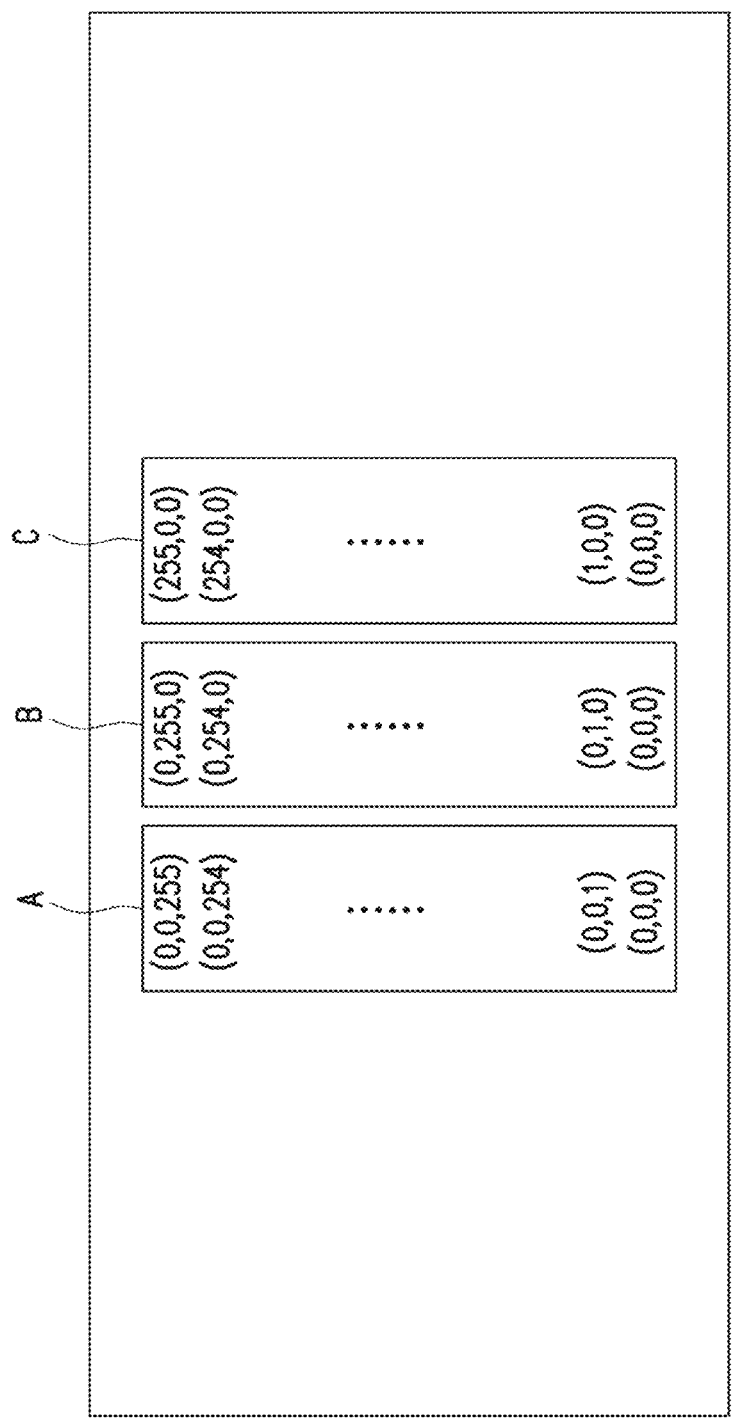
FIG. 4 is a schematic diagram of a correction image according to a second embodiment of the disclosure.

For example, FIG. 4 is a schematic diagram of a correction image according to a second embodiment of the disclosure. In FIG. 4, a single frame of the correction image includes regions A, B, and C formed from connecting multiple regions. The region A is a region disposed by connecting different lightness regions corresponding to a blue hue and is gradually distributed. The RGB gray level values thereof include (0, 0, 255), (0, 0, 254), . . . (0, 0, 1), and (0, 0, 0). The region B is a region disposed by connecting different lightness regions corresponding to a green hue and is gradually distributed. The RGB gray level values thereof include (0, 255, 0), (0, 254, 0), . . . (0, 1, 0), and (0, 0, 0). The region C is a region disposed by connecting different lightness regions corresponding to a red hue and is gradually distributed. The RGB gray level values thereof include (255, 0, 0), (254, 0, 0), . . . (1, 0, 0), and (0, 0, 0).

As shown in FIG. 4, different lightness regions of the same hue may be connected, and different lightness regions are gradually distributed therebetween instead of the block distribution as in the embodiment of FIG. 3. The gradual distribution may provide optical information corresponding to a more detailed lightness distribution, however, the acquisition range of the optical information for each lightness is relatively smaller, which has both advantages and disadvantages when compared with the manner of the embodiment of FIG. 3, and the user may choose appropriately according to requirements.

Figure 5:
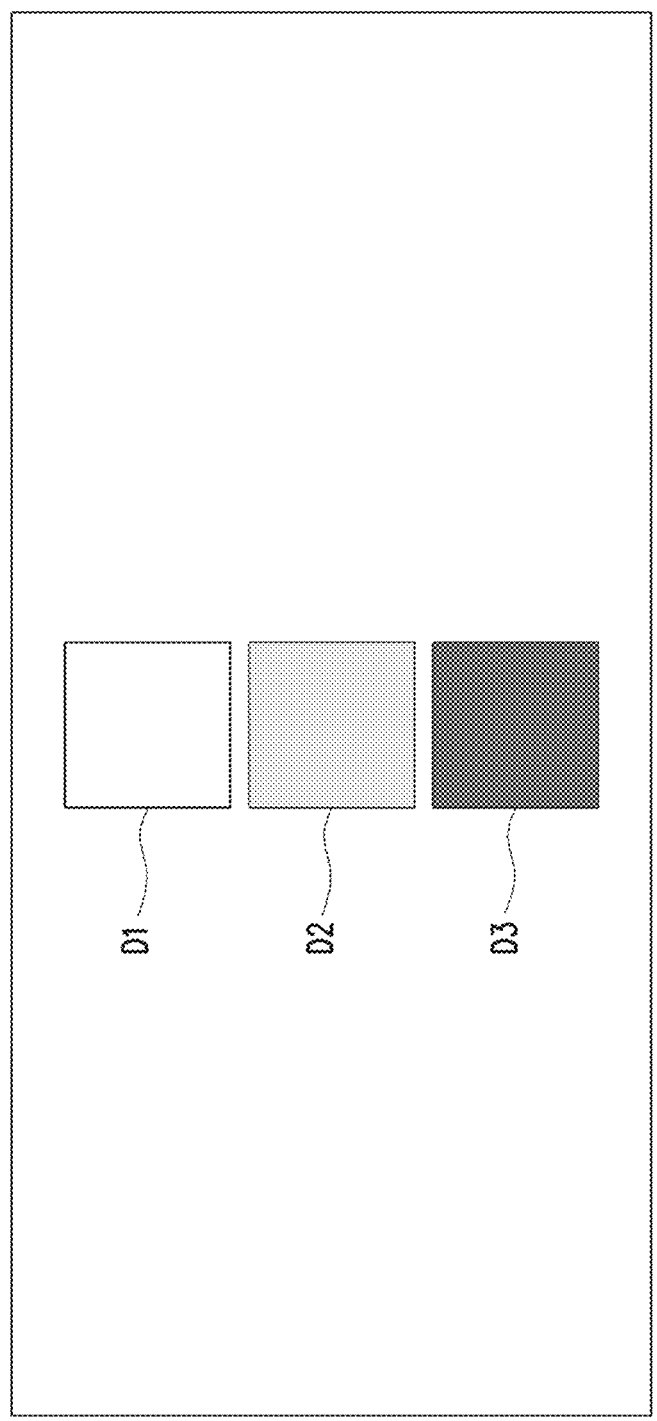
FIG. 5 is a schematic diagram of a correction image according to a third embodiment of the disclosure.

In other embodiments, the multiple regions included in the single frame of the correction image may also be multiple gray-scale regions with different gray-scales. Furthermore, for a black-and-white image, the first gray level value (for example, r value), the second gray level value (for example, g value), and the third gray level value (for example, b value) in the RGB gray level values are equal and may also be expressed as gray-scale values. Gray-scale refers to the color depth of points in the black-and-white image. For an 8-bit pixel, the gray-scale value ranges from 0 to 255, where white is 255 and black is 0. For example, the single frame of the correction image includes three regions with gray-scale values of 255, 100, and 0, respectively. For a 24-bit pixel, the RGB gray level value of white is (255, 255, 255), and the RGB gray level value of black is (0, 0, 0). FIG. 5 is a schematic diagram of a correction image according to a third embodiment of the disclosure. FIG. 5 shows that a single frame of the correction image includes multiple gray-scale regions D1, D2, and D3 with different gray-scales. For example, the gray level value of the gray-scale region D1 is (255, 255, 255), the gray level value of the gray-scale region D2 is (128, 128, 128), and the gray level value of the gray-scale region D3 is (64, 64, 64).

Figure 6:
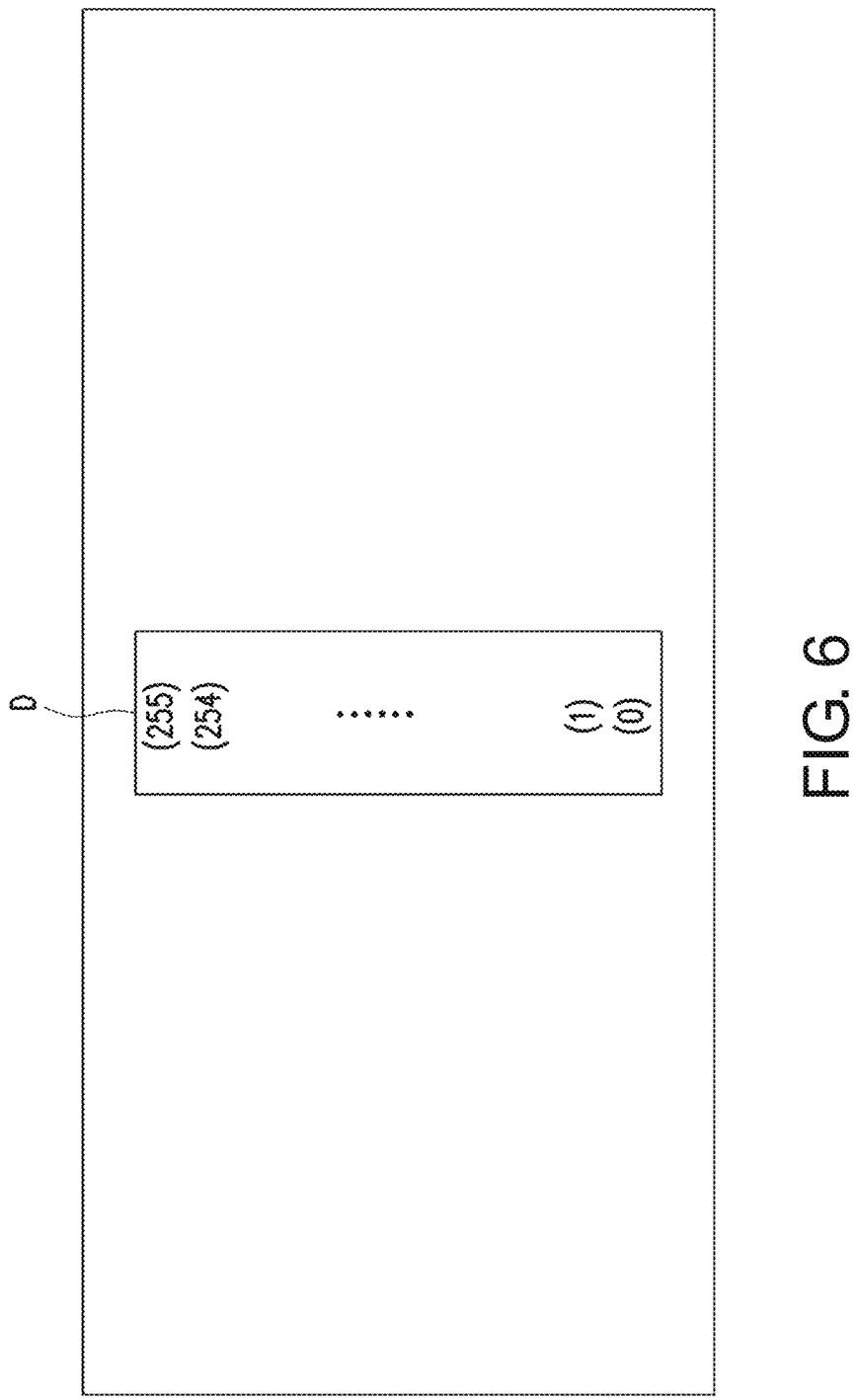
FIG. 6 is a schematic diagram of a correction image according to a fourth embodiment of the disclosure.

In the case where the single frame of the correction image includes multiple gray-scale regions with different gray-scales, the multiple gray-scale regions are connectedly disposed and gradually distributed, as shown in FIG. 6. FIG. 6 is a schematic diagram of a correction image according to a fourth embodiment of the disclosure. FIG. 6 shows that a single frame of the correction image includes a region D formed by connecting multiple gray-scale regions. The region D is connectedly disposed and gradually distributed. The gray-scale values thereof include (255), (254), . . . (1), and (0). In addition, for the 24-bit pixel, the RGB gray level values of the region D are (255, 255, 255), (254, 254, 254), . . . (1, 1, 1), and (0, 0, 0).

Figure 7:
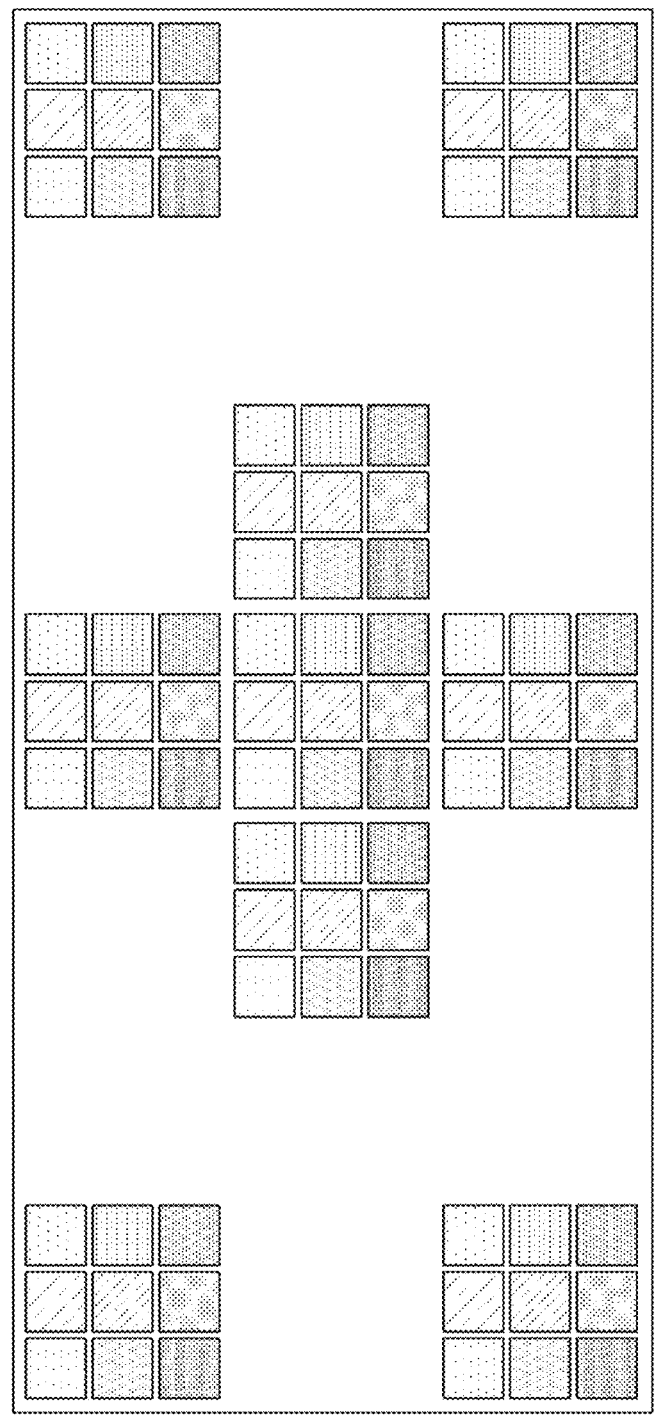
FIG. 7 is a schematic diagram of a correction image according to a fifth embodiment of the disclosure.
Figure 8:
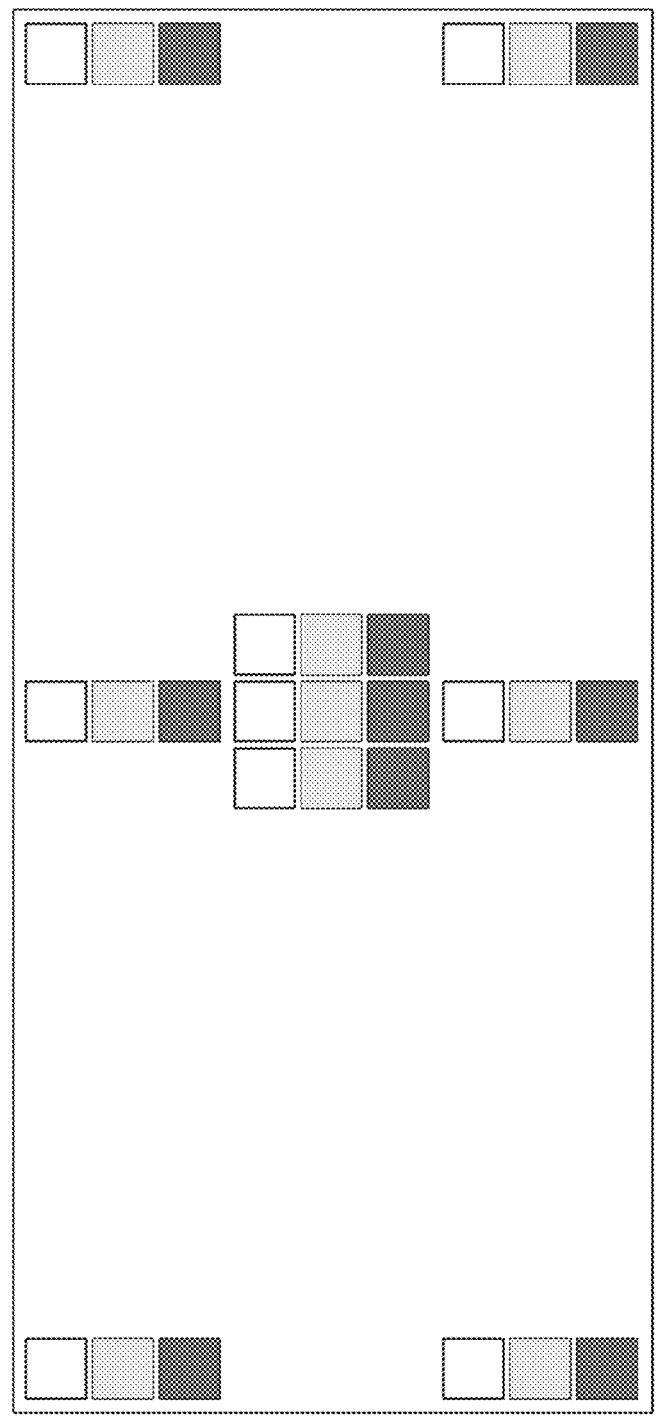
FIG. 8 is a schematic diagram of a correction image according to a sixth embodiment of the disclosure.

In addition, the single frame of the correction image also includes multiple region groups disposed at different positions, that is, at least one group of the multiple regions is repeatedly disposed again in a position different from the multiple regions, as shown in FIGS. 7 and 8. FIG. 7 is a schematic diagram of a correction image according to a fifth embodiment of the disclosure. FIG. 8 is a schematic diagram of a correction image according to a sixth embodiment of the disclosure.

The correction image shown in FIG. 7 is a modification of FIG. 3. In FIG. 7, the overall ratio of the regions A1 to A3, B1 to B3, and C1 to C3 shown in FIG. 3 is reduced and copied to be distributed at multiple positions in the correction image. This method may adjust the color in a small block more finely, and the user may also define the distribution of each hue region at the position to be adjusted to enhance the color correction effect at that position. If necessary, the user may also reduce and copy the overall ratio of the multiple regions A1 to A3, B1 to B3, and C1 to C3 shown in FIG. 3 to fill up the entire correction image of FIG. 7, so as to achieve better correction effect.

In other words, the single frame of the correction image of FIG. 7 includes repeatedly disposing the regions A1 to A3, the region B1 to B3, and the regions C1 to C3 at different positions from the regions A1 to A3, the regions B1 to B3, and the regions C1 to C3 of FIG. 3. In FIG. 7, 9 groups of the regions A1 to A3, the regions B1 to B3, and the regions C1 to C3 are repeatedly disposed.

The correction image shown in FIG. 8 is a modification of FIG. 5. A single frame of the correction image of FIG. 8 also includes repeatedly disposing the gray-scale regions D1, D2, and D3 at different positions from the gray-scale regions D1, D2, and D3 of FIG. 5. In FIG. 8, 9 groups of the gray-scale regions D1, D2, and D3 are repeatedly disposed.

Figure 9:
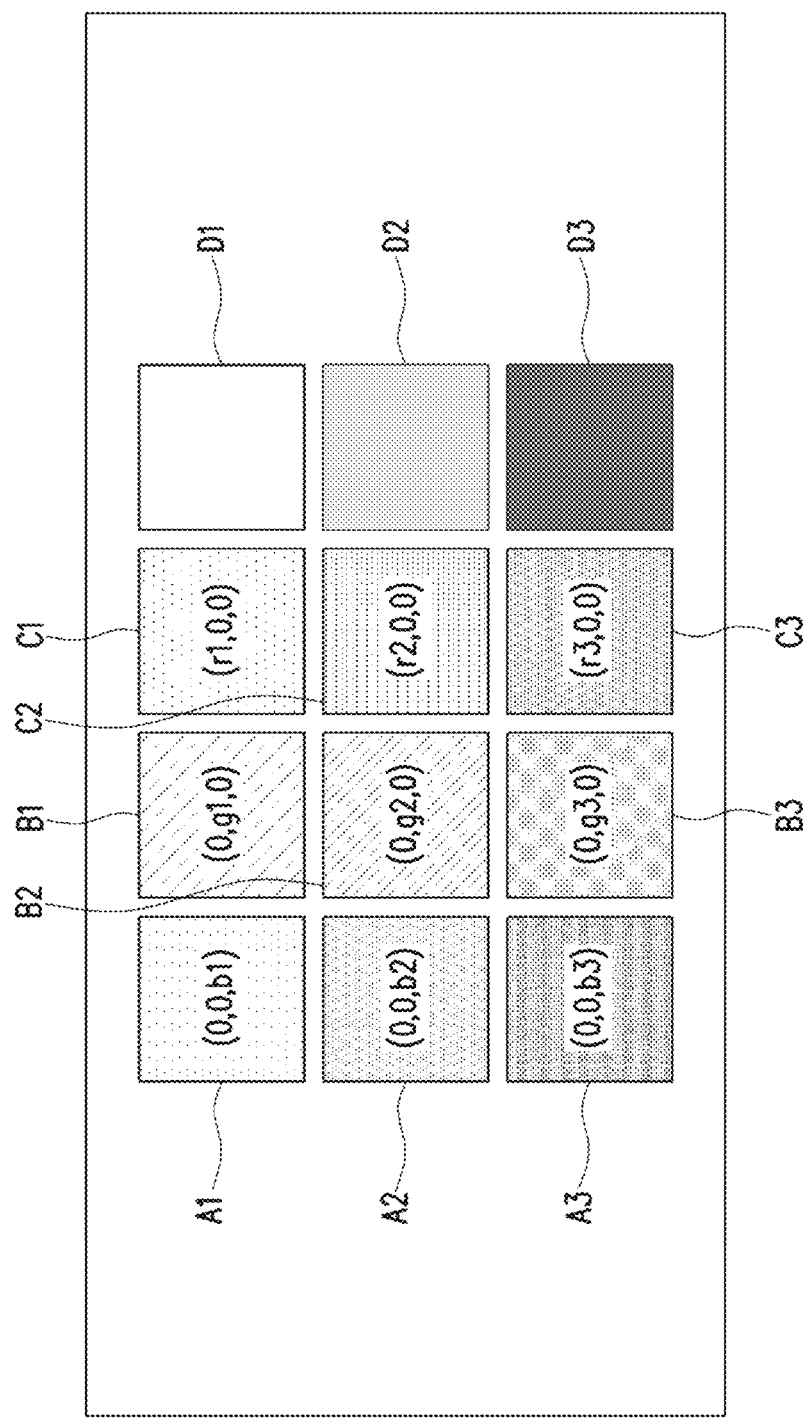
FIG. 9 is a schematic diagram of a correction image according to a seventh embodiment of the disclosure.
Figure 10:
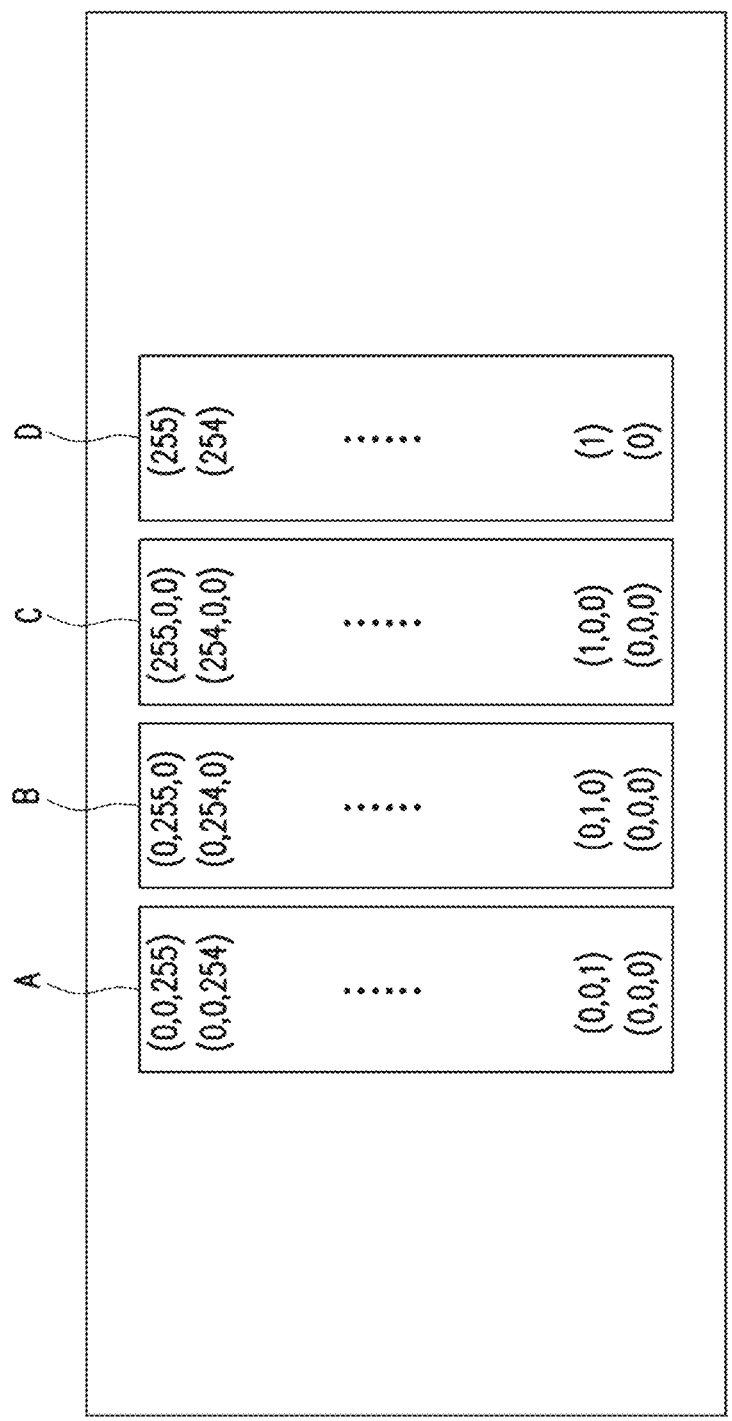
FIG. 10 is a schematic diagram of a correction image according to an eighth embodiment of the disclosure.

In other embodiments, in the case where multiple regions of the single frame of the correction image include multiple hue regions and multiple lightness regions, the multiple regions may also include multiple gray-scale regions, as shown in FIGS. 9 and 10.

FIG. 9 is a schematic diagram of a correction image according to a seventh embodiment of the disclosure. A single frame of the correction image shown in FIG. 9 simultaneously includes the regions A1 to A3, the regions B1 to B3, and the regions C1 to C3 shown in FIG. 3, and the gray-scale regions D1, D2, and D3 shown in FIG. 5.

FIG. 10 is a schematic diagram of a correction image according to an eighth embodiment of the disclosure. A single frame of the correction image shown in FIG. 10 simultaneously includes the regions A, B, and C shown in FIG. 4 and the region D shown in FIG. 6.

In summary, the embodiments of the disclosure have at least one of the following advantages or effects. In the foregoing embodiments, the color correction method and the color correction system of the disclosure use a single frame to project a correction image of different chromaticity, different lightness, or different gray-scales in different regions, and the optical information of the correction image is obtained by the image capture device and feedback to the processor to carry out correction. Therefore, it is possible to correct multiple groups of colors to be corrected at once, which greatly reduces the correction time. In addition, during practical application, if the user believes that a single correction is not accurate enough, multiple corrections may also be carried out. However, even if multiple corrections are carried out, compared with the prior art in which each hue and each lightness image is projected and corrected one by one, the technology of the disclosure can still greatly reduce the correction time.

The above are only the preferred embodiments of the disclosure, which cannot be used to limit the implementation scope of the disclosure, that is, any simple equivalent changes and modifications made according to the contents of the claims and the specification of the disclosure still belong to the protection scope of the disclosure. In addition, any embodiment or claim of the disclosure need not achieve all the objectives, advantages, or features disclosed by the disclosure. In addition, the abstract and the title of invention of the disclosure are only used to assist the search of patent documents, and are not intended to limit the scope of the disclosure. In addition, terms such as "first" and "second" mentioned in the specification or claims are only used to name the elements or distinguish different embodiments or ranges, and are not intended to limit the upper or lower limit of the number of elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Furthermore, the terms such as "first" and "second" mentioned in this specification or the appended claims are used to name different elements or to distinguish between different embodiments or ranges, and are not intended to limit the upper or lower limit of the number of elements. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A color correction method, comprising:
projecting a correction image to a projection screen based on a predefined value, wherein a single frame of the correction image comprises a plurality of hue regions, and each of the plurality of hue regions have a plurality of lightness regions;
obtaining a captured image by capturing the projection screen;
detecting optical information of the captured image;
comparing the optical information with the predefined value to obtain an uneven color region that does not conform to the predefined value; and
adjusting the uneven color region, so that the optical information of the uneven color region conforms to the predefined value,
wherein each of the plurality of lightness regions comprises a corresponding RGB gray level value, the corresponding RGB gray level value comprises a first gray level value corresponding to a first primary color, a second gray level value corresponding to a second primary color, and a third gray level value corresponding to a third primary color.

2. The color correction method according to claim 1, wherein in a case where the plurality of hue regions have different hues, when each of the hues is a pure primary color, and the pure primary color is one of the first primary color, the second primary color, and the third primary color, then one of the first gray level value, the second gray level value, and the third gray level value of the plurality of lightness regions corresponding to each of the plurality of hue regions that corresponds to the pure primary color is not zero while the other two are zero, and any two of the non-zero RGB gray level values of the plurality of lightness regions corresponding to each of the plurality of hue regions are not the same.

3. The color correction method according to claim 1, wherein in a case where the plurality of hue regions have different hues, when each of the hues is not a pure primary color, and the pure primary color is one of the first primary color, the second primary color, and the third primary color, then at least two of the first gray level value, the second gray level value, and the third gray level value of the plurality of lightness regions corresponding to each of the plurality of hue regions are not zero, and a ratio of the first gray level value to the second gray level value to the third gray level value of the plurality of lightness regions corresponding to each of the plurality of hue regions is the same, and any two of the corresponding RGB gray level values of the plurality of lightness regions are not the same.

4. The color correction method according to claim 1, wherein the plurality of lightness regions corresponding to one of the plurality of hue regions are separated from or connected to each other.

5. The color correction method according to claim 1, wherein in a case where the plurality of hue regions have different hues, the plurality of lightness regions corresponding to each of the plurality of hue regions are connectedly disposed and gradually distributed.

6. The color correction method according to claim 1, wherein the single frame of the correction image further comprises at least one group of the plurality of regions repeatedly disposed at a position different from the plurality of regions.

7. The color correction method according to claim 1, wherein the correction image further comprises a plurality of gray-scale regions having different gray-scales.

8. A color correction system, comprising a source device, an image capture device, and a processor, wherein:
the source device projects a correction image to a projection screen based on a predefined value, a single frame of the correction image comprises a plurality of hue regions, and each of the plurality of hue regions has a plurality of lightness regions;
the image capture device obtains a captured image by capturing the projection screen; and
the processor, coupled to the image capture device and the source device, receives the captured image, detects optical information of the captured image, compares the optical information with the predefined value to obtain an uneven color region that does not conform to the predefined value, and adjusts the uneven color region, so that the optical information of the uneven color region conforms to the predefined value,
wherein each of the plurality of lightness regions comprises a corresponding RGB gray level value, the corresponding RGB gray level value comprises a first gray level value corresponding to a first primary color, a second gray level value corresponding to a second primary color, and a third gray level value corresponding to a third primary color.

9. The color correction system according to claim 8, wherein in a case where the plurality of hue regions have different hues, when each of the hues is a pure primary color, and the pure primary color is one of the first primary color, the second primary color, and the third primary color, then one of the first gray level value, the second gray level value, and the third gray level value of the plurality of lightness regions corresponding to each of the plurality of hue regions that corresponds to the pure primary color is not zero while the other two are zero, and any two of the non-zero RGB gray level values of the plurality of lightness regions corresponding to each of the plurality of hue regions are not the same.

10. The color correction system according to claim 8, wherein in a case where the plurality of hue regions have different hues, when each of the hues is not a pure primary color, and the pure primary color is one of the first primary color, the second primary color, and the third primary color, then at least two of the first gray level value, the second gray level value, and the third gray level value of the plurality of lightness regions corresponding to each of the plurality of hue regions are not zero, and a ratio of the first gray level value to the second gray level value to the third gray level value of the plurality of lightness regions corresponding to each of the plurality of hue regions is the same, and any two of the corresponding RGB gray level values of the plurality of lightness regions are not the same.

11. The color correction system according to claim 8, wherein the plurality of lightness regions corresponding to one of the plurality of hue regions are separated from or connected to each other.

12. The color correction system according to claim 8, wherein in a case where the plurality of hue regions have different hues, the plurality of lightness regions corresponding to each of the plurality of hue regions are connectedly disposed and gradually distributed.

13. The color correction system according to claim 8, wherein the single frame of the correction image further comprises at least one group of the plurality of hue regions repeatedly disposed at a position different from the plurality of hue regions.

14. The color correction system according to claim 8, wherein the correction image further comprises a plurality of gray-scale regions having different gray-scales.

15. The color correction system according to claim 8, wherein the image capture device is disposed in the source device.

16. A color correction method, comprising:
projecting a correction image to a projection screen based on a predefined value, wherein a single frame of the correction image comprises a plurality of regions, the plurality of regions comprises a plurality of hue regions having different hues and a plurality of lightness regions having different lightness corresponding to the hues, or the plurality of regions comprises a plurality of gray-scale regions having different gray-scales;
obtaining a captured image by capturing the projection screen;
detecting optical information of the captured image;
comparing the optical information with the predefined value to obtain an uneven color region that does not conform to the predefined value; and
adjusting the uneven color region, so that the optical information of the uneven color region conforms to the predefined value,
wherein in a case where the plurality of regions comprise the plurality of hue regions having different hues, the plurality of lightness regions corresponding to each of the plurality of hue regions are connectedly disposed and gradually distributed.

17. A color correction method, comprising:
projecting a correction image to a projection screen based on a predefined value, wherein a single frame of the correction image comprises a plurality of regions, the plurality of regions comprises a plurality of hue regions having different hues and a plurality of lightness regions having different lightness corresponding to the hues, or the plurality of regions comprises a plurality of gray-scale regions having different gray-scales;
obtaining a captured image by capturing the projection screen;
detecting optical information of the captured image;
comparing the optical information with the predefined value to obtain an uneven color region that does not conform to the predefined value; and
adjusting the uneven color region, so that the optical information of the uneven color region conforms to the predefined value,
wherein the single frame of the correction image further comprises at least one group of the plurality of regions repeatedly disposed at a position different from the plurality of regions.

18. A color correction system, comprising a source device, an image capture device, and a processor, wherein:
the source device projects a correction image to a projection screen based on a predefined value, a single frame of the correction image comprises a plurality of regions, the plurality of regions comprises a plurality of hue regions having different hues and a plurality of lightness regions having different lightness corresponding to the hues, or the plurality of regions comprises a plurality of gray-scale regions having different gray-scales;
the image capture device obtains a captured image by capturing the projection screen; and
the processor, coupled to the image capture device and the source device, receives the captured image, detects optical information of the captured image, compares the optical information with the predefined value to obtain an uneven color region that does not conform to the predefined value, and adjusts the uneven color region, so that the optical information of the uneven color region conforms to the predefined value,
wherein in a case where the plurality of regions comprise the plurality of hue regions having different hues, the plurality of lightness regions corresponding to each of the plurality of hue regions are connectedly disposed and gradually distributed.

19. A color correction system, comprising a source device, an image capture device, and a processor, wherein:
the source device projects a correction image to a projection screen based on a predefined value, a single frame of the correction image comprises a plurality of regions, the plurality of regions comprises a plurality of hue regions having different hues and a plurality of lightness regions having different lightness corresponding to the hues, or the plurality of regions comprises a plurality of gray-scale regions having different gray-scales;
the image capture device obtains a captured image by capturing the projection screen; and
the processor, coupled to the image capture device and the source device, receives the captured image, detects optical information of the captured image, compares the optical information with the predefined value to obtain an uneven color region that does not conform to the predefined value, and adjusts the uneven color region, so that the optical information of the uneven color region conforms to the predefined value,
wherein the single frame of the correction image further comprises at least one group of the plurality of regions repeatedly disposed at a position different from the plurality of regions.

20. A color correction method, comprising:
projecting a correction image to a projection screen based on a predefined value, wherein a single frame of the correction image comprises a plurality of gray-scale regions having different gray-scales;
obtaining a captured image by capturing the projection screen;
detecting optical information of the captured image;
comparing the optical information with the predefined value to obtain an uneven color region that does not conform to the predefined value; and
adjusting the uneven color region, so that the optical information of the uneven color region conforms to the predefined value,
wherein each of the plurality of gray-scale regions comprises a corresponding RGB gray level value, the corresponding RGB gray level value comprises a first gray level value corresponding to a first primary color, a second gray level value corresponding to a second primary color, and a third gray level value corresponding to a third primary color, wherein the first gray level value, the second gray level value, and the third gray level value are the same in one gray-scale region, and wherein different gray-scale regions have different first gray level values, different second gray level values, and different third gray level values.

21. The color correction method according to claim 20, wherein in a case where the plurality of gray-scale regions have different gray-scales, the plurality of gray-scale regions are connectedly disposed and gradually distributed.

22. A color correction system, comprising a source device, an image capture device, and a processor, wherein:
the source device projects a correction image to a projection screen based on a predefined value, wherein a single frame of the correction image comprises a plurality of gray-scale regions having different gray-scales;
the image capture device obtains a captured image by capturing the projection screen; and
the processor, coupled to the image capture device and the source device, receives the captured image, detects optical information of the captured image, compares the optical information with the predefined value to obtain an uneven color region that does not conform to the predefined value, and adjusts the uneven color region, so that the optical information of the uneven color region conforms to the predefined value,
wherein each of the plurality of gray-scale regions comprises a corresponding RGB gray level value, the corresponding RGB gray level value comprises a first gray level value corresponding to a first primary color, a second gray level value corresponding to a second primary color, and a third gray level value corresponding to a third primary color, wherein the first gray level value, the second gray level value, and the third gray level value are the same in one gray-scale region, and wherein different gray-scale regions have different first gray level values, different second gray level values, and different third gray level values.

23. The color correction system according to claim 22, wherein in a case where the plurality of gray-scale regions have different gray-scales, the plurality of gray-scale regions are connectedly disposed and gradually distributed.

* * * * *